Patented Nov. 6, 1928.

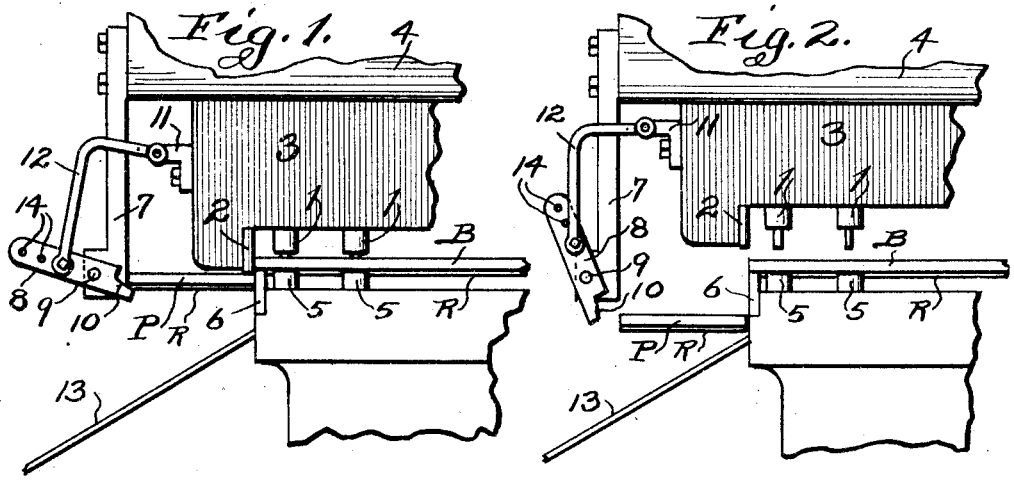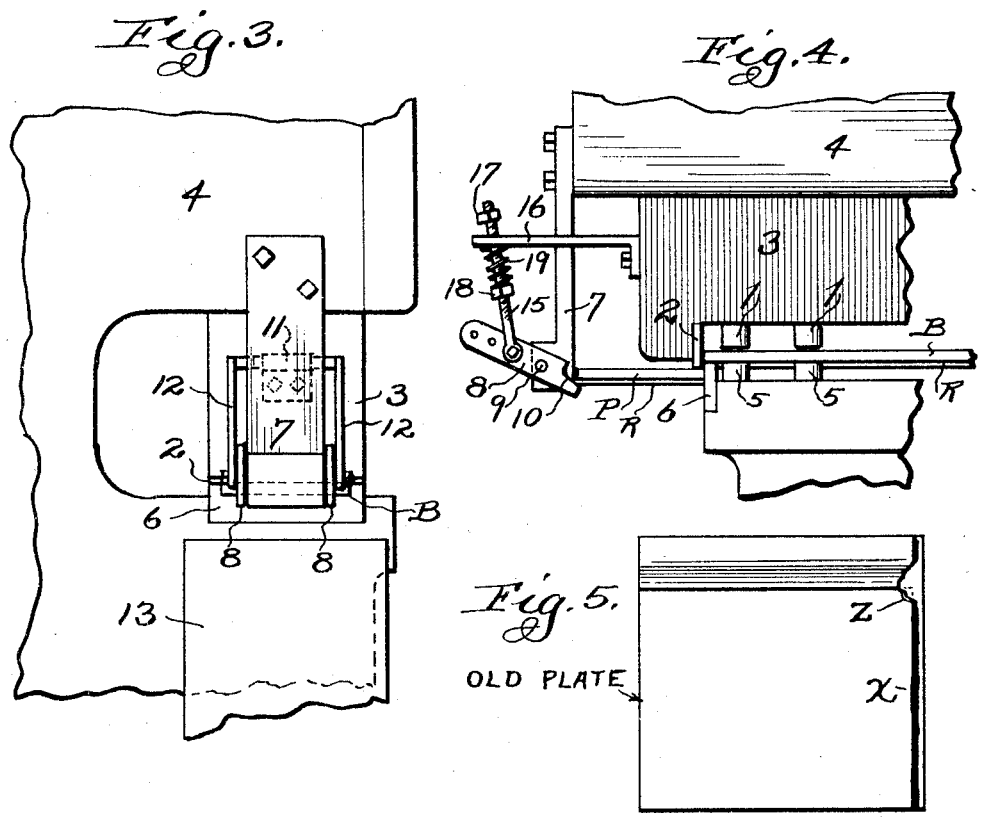

1,690,503

UNITED STATES PATENT OFFICE.

ARVID RHODES, OF CHICAGO, ILLINOIS, ASSIGNOR TO THE RAILROAD SUPPLY COMPANY, OF CHICAGO, ILLINOIS, A CORPORATION OF ILLINOIS.

SHEARING MACHINE.

Application filed July 22, 1927. Serial No. 207,627.

My invention relates to machines for shearing or cutting bars or strips of metal, and particularly for shearing bars designed to form tie-plates each having one or more cross-shoulders on its upper surface against which the flanges of the railroad rails abut when the plates are placed in track. Plates of this character are frequently rolled in long strips or bars, each having one or more longitudinal ribs on one of its faces which, when the bars are cut into separate plates by a shearing machine, form the rail-abutting cross-shoulders on the rail-bearing faces of the plates. In cutting these bars into sections to form tie-plates the reciprocating shearing-blade is located above the line or path of travel of the bar and operates against a stationary blade upon which the lower face of the bar rests. As the shearing blade cuts the bar its downward thrust and the weight of the plate beyond the cut cause the plate to bodily descend more or less, and as the cut progresses the free or leading end of the plate drops and the body of the plate tilts or inclines downwardly at an angle from the normal line of the bar with the result that frequently the inner sides of the plates are cut more or less on an upward bevel instead of on a line vertical with their rail-bearing faces, thus giving one side of the plates a distorted or irregular contour or configuration, as shown for example at $x$ in Fig. 5. Also as these bars are usually up-side down when punched for the spike-holes in the plates, i. e., with their faces which form the rail-seats resting on the stationary lower blade, when they are simultaneously punched and sheared by the same machine the above-mentioned downwardly swinging or tilting movement of the plates as they are sheared frequently causes the inner end of the longitudinal rib which forms a shoulder on the tie-plate to bulge inwardly toward the rail-seat at the line of severance, with the result that the metal at that end of the rib is more or less crowded or displaced transversely of the rib and forms a fin or projection on the vertical face of the tie-plate shoulder, as shown for example at $z$ in Fig. 5, which prevents the rail-flange from seating snugly and properly against the shoulder when the plates are in track. Both of these objections develop in cold shearing of the bars, and are more frequent in hot shearing, the distortion of the metal being easier and greater when it is hot.

The object of the present invention is to provide a shearing machine with a movable support which is automatically brought to position under the leading end of the bar when a cut is to be made and prevents the plate which is being severed from tilting or swinging downwardly, and then is withdrawn from its operative position upon completion of the cut to allow the severed plate to drop flatwise on the runway leading away from the machine.

The invention consists in the matters hereinafter described and claimed, and is illustrated in practical embodiment in the accompanying drawings, in which the same or reference numerals indicate the same or similar parts in the various views and Fig. 1 is a view in front elevation of a portion of a combined punching and shearing-machine embodying my improvements with the bar-support in operative position; Fig. 2 is a similar view with the parts in different positions to show the bar-support withdrawn to its inoperative position; Fig. 3 is a rear end elevation of the same showing details of parts; Fig. 4 is a detail view showing an alternative means for operating the bar-support, and Fig. 5 is a detail view showing a tie-plate having typical distortions or imperfections resulting from the former practice.

In the practice of my invention, the punches 1 and the movable shear-blade 2 are secured in any suitable manner in the reciprocating head 3 which is supported and guided in the press 4. The lower dies 5 and the stationary shear-blade 6 are supported on the bed-plate of the machine, and a suitable stop 7 is arranged at a predetermined point in the path of the bar B being operated on to position its leading end at the desired distance from the shear line according to the length of the plates. These features are of any suitable form now well-known in the art, and so their arrangement, construction and mode of operation for punching spike-holes in a rolled bar or strip B having a longitudinal rib R and then successively severing the plates P from the bar as the latter is moved step-by-step through the machine need not be described in detail.

The means for periodically supporting the leading end of the bar consists of a movable latch mechanism which is pivotally mounted on the press and operated by the reciprocating head. In the exemplification shown the latch consists of a pair of levers 8 pivoted at 9 on the opposite sides of the stop 7; the levers are spaced apart a suitable distance to engage the plate near its sides, and the inner end of each lever is preferably, though not necessarily, formed with an inwardly and downwardly inclined or tapered lip 10 to more readily release the severed plate when the latch is withdrawn.

Referring to Figs. 1 to 3, a latch-operating arm 11 is fixed at its inner end on the head 3 and carries at its outer end a pivoted yoke 12 whose ends project laterally beyond the sides of the stop 7 and are bent down to engage the outer ends of the levers 8 to swing them on their pivots and move their lips into and out of position under the leading end of the bar B as the head descends and ascends respectively in the cutting operation, the parts being so related and timed in operation that the latch swings up and supports the leading end of the bar to prevent the plate from tilting during the cutting operation as shown for example in Fig. 1, and then swings down to release the severed plate P and permit it to fall flatwise on the inclined guide 13 as shown in Fig. 2. The operating yoke is adjustably connected to the levers to swing them more or less toward the line of the bar to accommodate bars of different lengths and thicknesses; this may be accomplished by providing the outer ends of the levers with a plurality of holes 14 spaced at different distances from their pivots to receive the free ends of the yoke.

Referring to Fig. 4 the latch lever 8 pivoted at 9 on the stop 7 is operated by a resilient actuator consisting of a threaded rod 15 pivotally connected at its lower end to the latch at one of the holes 14 and passing upwardly freely through an operating wing or bracket 16 fixed on the head 3 and having a fixed nut 17 above the wing and an adjustable nut 18 below it, and a coiled spring 19 between the wing 16 and nut 18. Upon the initial downward movement of the head the wing compresses the spring which acts on the nut 18 to move the rod 15 downwardly and swing the latch up into operative position against the bar B; the further descent of the head for the cutting operation compresses the spring, and when the head ascends to its upward position it carries the nut 17 and rod 15 back to their initial positions and rocks the latch downward to discharge the severed plate. The tension of the spring 19 can be adjusted by running the nut 18 up or down on the rod 15 and locking it in position thereon. While only one latch lever and its operative parts are shown in Fig. 4 it is understood that this construction will be duplicated at the other side of the stop 7.

The latch is suitably disposed in relation to the stop to swing up into position under the leading end of the bar when that end is against the stop, and the latch is disposed in relation to the line of the bar to prevent the plates from tilting or inclining during the cutting operation. In the arrangement shown in Fig. 1, the latch when swung into operative position is sufficiently below the line of the bar to afford a clearance approximately equal to the thickness of the latter, so that as the section of the bar being sheared is moved bodily downward by its weight and the thrust of the reciprocating blade its free end will come to rest on the latch just before the cut is completed, and the section being severed will be prevented from tilting. In the arrangement shown in Fig. 4, the latch when swung into operative position is in contact with the end of the bar and continued in that relation during the bodily downward movement of the plate.

While the machine of my invention is particularly adapted for shearing tie-plate bars, it can be used for shearing other metal bars to obviate similar objections. The form and construction of the movable bar-support as well as the devices to carry it and the connections to reciprocate it into and out of its operative position in synchronism with the operation of the shearing blade, may be varied without departing from the scope of my invention.

I claim:

1. In a machine for shearing metal bars, the combination of a reciprocating head having a shear blade, a bar-support mounted on the machine beyond the leading end of the bar being sheared and movable into and out of position to engage and disengage said leading end of the bar, and connections between said support and head to actuate the support as the blade is operated.

2. In a machine for shearing tie-plate bars, the combination of a reciprocating head having a shear blade, a bar-support pivoted on the machine beyond the leading end of the bar being sheared, movable into and out of position to engage and disengage said leading end of the bar, and connections between said support and head to actuate the support as the blade is operated.

3. In a machine for shearing tie-plate bars, the combination of a frame having a reciprocating head carrying a shear blade, a latch pivotally carried by the frame beyond the leading end of the bar being sheared and arranged to engage and disengage said leading end of the bar, and an arm carried on the head and connected to the latch to swing the latter into and out of position to engage and disengage the leading end of the bar when the blade is operated.

4. In a machine for shearing tie-plate bars, the combination of a frame having a reciprocating head carrying a shear blade, a latch pivotally carried by the frame beyond the leading end of the bar being sheared and having a downwardly beveled lip arranged to engage and disengage said leading end of the bar, and an arm carried on the head and adjustably connected to the latch to swing the latter into and out of position to engage and disengage the leading end of the bar when the blade is operated.

5. In a machine for shearing tie-plate bars, the combination of a frame having a reciprocating head carrying a shear blade, a stop carried by the frame to engage the leading end of the bar being operated on, a latch pivoted on said stop beyond said leading end of the bar and movable to position thereunder, and an arm carried on the head and connected to the latch to swing the latter into and out of position to engage and disengage the leading end of the bar when the blade is operated.

In testimony whereof I affix my signature.

ARVID RHODES.